United States Patent

Higashi et al.

[11] Patent Number: 6,021,630
[45] Date of Patent: Feb. 8, 2000

[54] HAND-HELD, ENGINE-POWERED BUSH CUTTING MACHINE

[75] Inventors: Kenji Higashi; Kenjiro Hiratsuna; Takashi Ikeda; Atsushi Kojima; Atsushi Miyazaki, all of Wako, Japan

[73] Assignee: Honda Giken Kogyo Kabushiki Kaisha, Japan

[21] Appl. No.: 09/317,582

[22] Filed: May 24, 1999

[30] Foreign Application Priority Data

Jul. 2, 1998 [JP] Japan ................... 10-187768
Apr. 13, 1999 [JP] Japan ................... 11-105522

[51] Int. Cl.[7] .................................. A01D 35/26
[52] U.S. Cl. ............................. 56/11.3; 30/276
[58] Field of Search ................. 56/1, 11.3, 12.7; 30/276, 277.4, 240, 264, 381, 382; 477/199–202; 188/77 R, 77 W; 192/17 R

[56] References Cited

U.S. PATENT DOCUMENTS 4,669,590  6/1987  Zindler et al. ................. 192/17 R
5,086,890  2/1992  Turczyn et al. ................. 192/1.44
5,526,635  6/1996  Wilder, Jr. ..................... 56/11.3
5,636,444  6/1997  Nickel ........................... 30/276
5,797,251  8/1998  Busboom ....................... 56/11.3

FOREIGN PATENT DOCUMENTS 50-129319  10/1975  Japan .

*Primary Examiner*—Robert E. Pezzuto
*Attorney, Agent, or Firm*—Adams & Wilks

[57] ABSTRACT

A bush cutting machine comprises a clutch case attached to a front part of an engine, an operation rod extending forwardly from the clutch case and having a brake lever, a cutting blade provided at a distal end of the operation rod, and a transmission shaft passing through the operation rod for transmitting drive power to the cutting blade. A brake drum is housed in the clutch case for braking the rotation of the cutting blade. A brake arm is swingably attached to a front wall of the clutch case closely to the brake drum. The brake arm carries at one end thereof a brake shoe for press contacting an outer peripheral surface of the brake drum. A brake wire is mounted between the brake lever and brake arm. The brake wire is disposed to extend along either external surface of the operation rod.

14 Claims, 16 Drawing Sheets

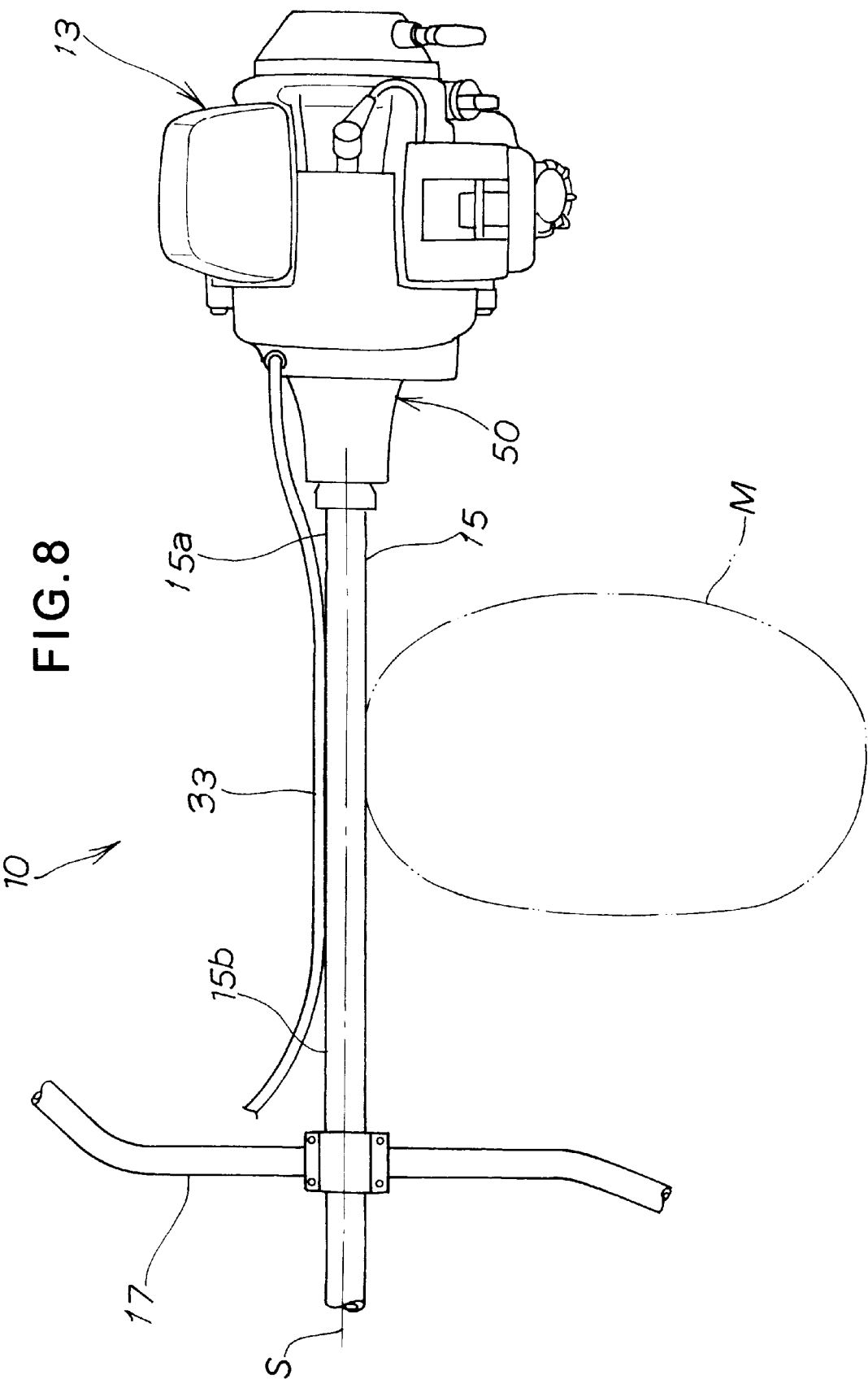

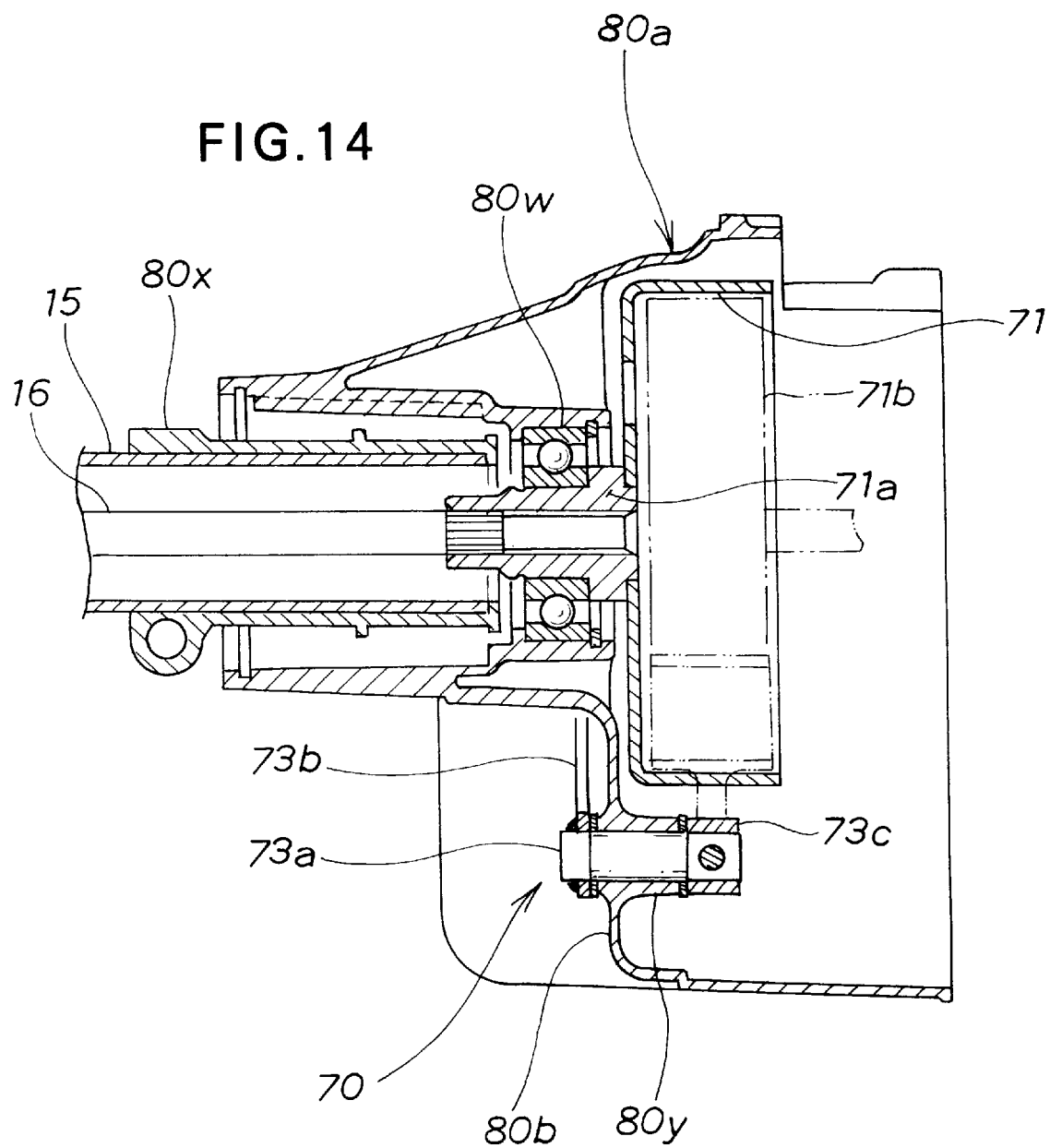

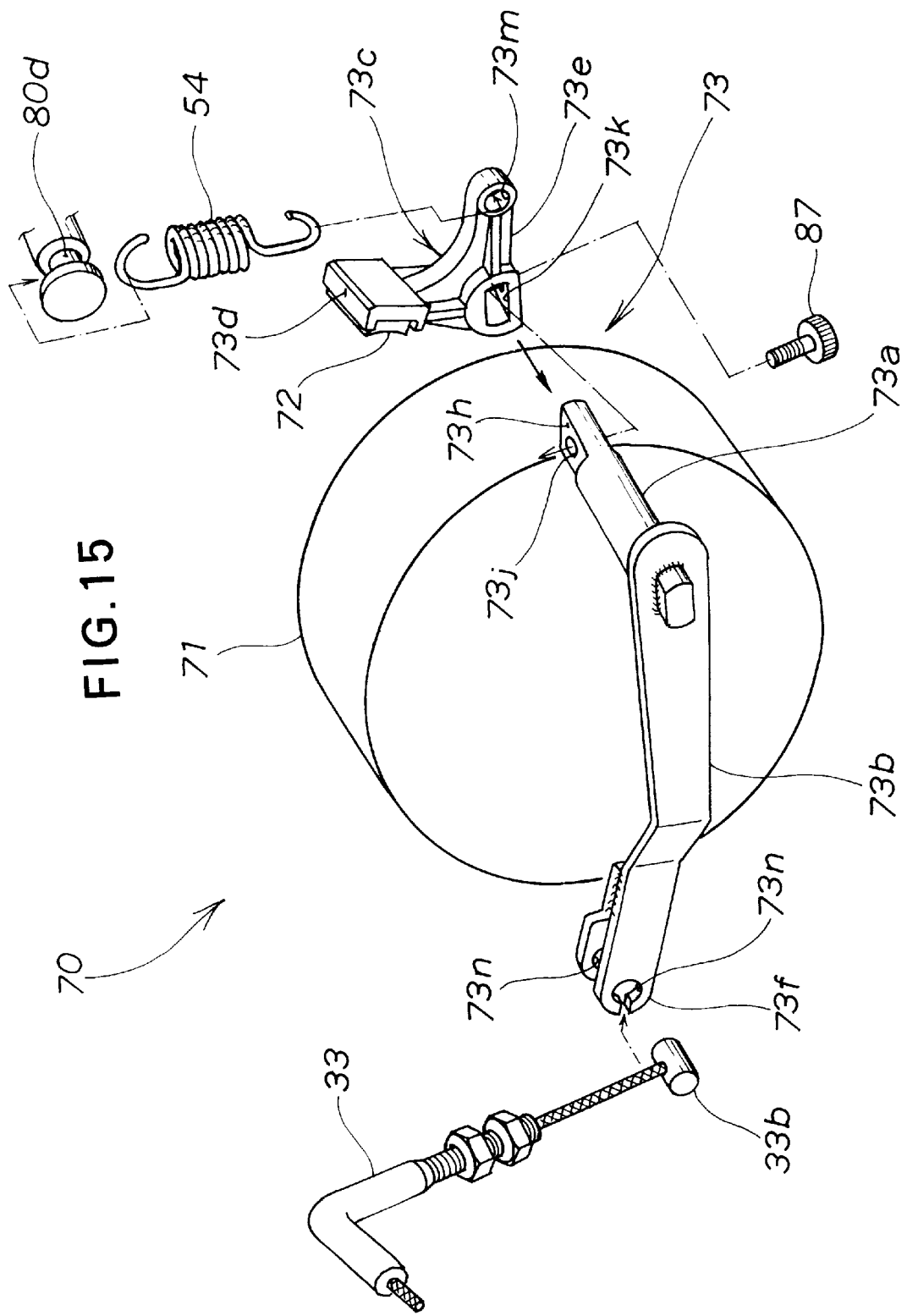

HAND-HELD, ENGINE-POWERED BUSH CUTTING MACHINE

BACKGROUND OF THE INVENTION

1. Field of the Invention

This invention relates to an improvement in a hand-held, engine-powered bush cutting machine having a rotary cutting blade for cutting weeds and small trees.

2. Description of the Related Art

An example of hand-held, engine-powered bush cutting machines is disclosed in Japanese Patent Laid-Open Publication No. SHO-50-129319. The disclosed bush cutting machine includes a brake device for positively applying, upon removal of power transmission to a cutting blade thereof, a braking force to the cutting blade to prevent rotation under inertia of the cutting blade. The bush cutting machine comprises a operation rod, an engine disposed at a proximal end of the operation rod, a transmission shaft passing through the operation rod and operatively connected with the engine, and a rotary cutting blade mounted to a top end of the transmission shaft. A brake drum mounted to a proximal end of the transmission shaft is housed in a clutch case provided at the proximal end of the operational rod. A pair of brake shoes brakes the drum by press contacting an outer peripheral surface of the drum. These brake shoes are supported by brake elements having links attached to their free ends. The links are pivotally attached to a lever which is in turn attached pivotally to the clutch case via a pin. The lever has a brake wire attached to one end thereof.

In the prior bush cutting machine, the lever for actuating the brake device and brake wire are disposed above the clutch case. Consequently, the lever and brake wire are apt to touch operator's arms and body during bush cutting operations, thereby obstructing those operations.

Further, in the bush cutting machine, parts of the brake device for braking the cutting blade, namely, upper portions of the brake shoes, links, lever, pin and the brake wire, are exposed to above the clutch case. Consequently, those parts are exposed to the weather during bush cutting operations, thus leading to the parts getting rusted. This requires measures to be taken to make the parts rust-proof.

One measure would be to arrange for the parts to be housed in the clutch case. However, with those parts housed in the clutch case, difficulty is encountered in performing such maintenance operations as adjusting a play of the brake wire and changing the wire to a new one, because the parts inside the clutch case can not be accessed directly and the clutch case need be removed from the engine.

SUMMARY OF THE INVENTION

It is therefore an object of the present invention to provide a bush cutting machine in which a lever and brake wire do not obstruct bush cutting operations.

Another object of the present invention is to provide a bush cutting machine in which parts making up a brake device are water- and dust-proofed and which does not obstruct bush cutting operations.

According to the present invention, there is provided a bush cutting machine which includes an operation rod and a brake wire disposed to extend along either outer side surface of the operation rod. For example, the brake wire is disposed to extend along a rod side surface remote from an operator with the operation rod held between a side of the operator and the brake wire for performing a bush cutting operation. Consequently, the brake wire will not touch a body or an arm of the operator during bush cutting, because the brake wire is positioned on the rod side remote from the operator. As a result, a bush cutting operation can be performed with increased efficiency since such an operation will not be disturbed.

In the bush cutting machine according to the present invention, a support shaft connected to a brake arm is provided to that side of a vertical center line of the operation rod which is closer to the operator below a horizontal center line of the rod. With the support shaft being positioned below the horizontal center line of the rod, the bush cutting machine has a lowered center of gravity, whereby the machine becomes stable and easy to operate. Further, since the support shaft is positioned to that side of the vertical center line which is closer to the operator, it becomes possible to arrange the brake arm to extend deeply in a direction away from the operator, whereby an operational force arising from the operation of the brake lever becomes small.

In a preferred form, the bush cutting machine also includes a spring attached to the brake arm such that it urges to cause a brake shoe to be pressed against a brake drum. The brake arm includes a first arm portion extending from a support shaft of the brake arm to an arm portion where the brake wire is attached, a second arm portion extending from the support shaft to an arm portion where the brake shoe is attached, and a third arm portion extending from the support shaft to an arm portion where the spring is attached. With the proximal ends of the second and third arm portions brought closely to each other, the first, second and third arm portions jointly form the brake arm into a generally Y-shaped configuration. With the generally Y-shaped brake arm, a brake unit becomes compact, thereby downsizing the bush cutting machine.

In addition, a cover is provided in the bush cutting machine for covering the first arm portion. As a result, the first arm portion is covered by the cover while the second and third arm portions are covered within a clutch case, whereby the brake unit is water- and dust-proofed. With the cover removed, it also becomes possible to change the brake wire and to adjust a play in the brake wire easily, thus making maintenance operations on the brake unit easy to perform.

BRIEF DESCRIPTION OF THE DRAWINGS

Certain preferred embodiments of the present invention will hereinafter be described in detail, by way of example only, with reference to the accompanying drawings, in which:

FIG. 8 is a partial top plan view showing the positioning of a brake wire relative to the bush cutting machine;

FIG. 14 is a cross-sectional view similar to FIG. 6 but illustrates the brake unit of FIG. 12;

FIG. 15 is an exploded perspective view illustrating the brake unit of FIG. 12.

DETAILED DESCRIPTION OF THE PREFERRED EMBODIMENT

The following description is merely exemplary in nature and is in no way intended to limit the invention or its application or uses.

Figure 1:
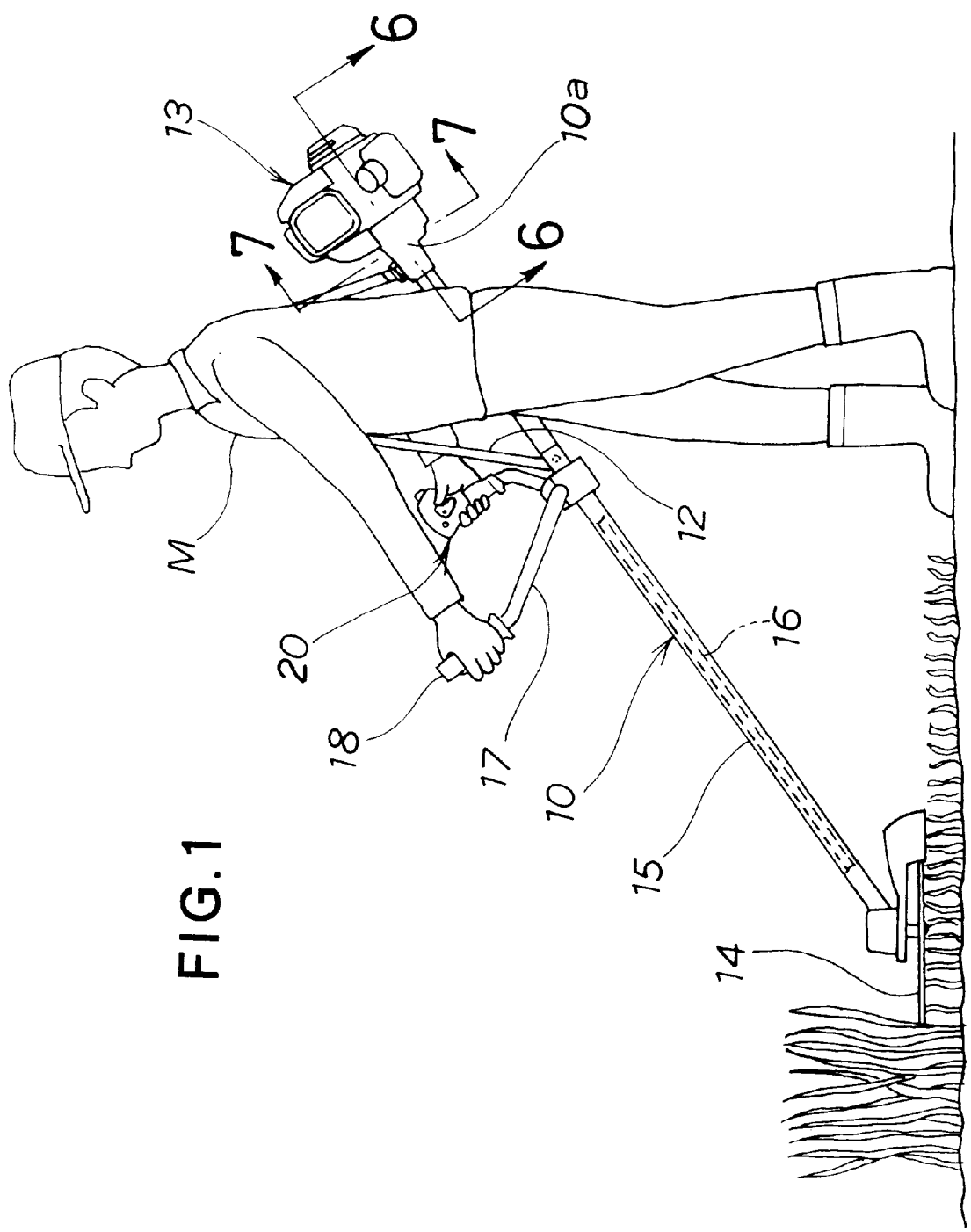
FIG. 1 is a side elevational view showing a hand-held bush cutting machine in use.

Reference is made initially to FIG. 1 illustrating how a hand-held bush cutting machine 10 according to the present invention is used. While in use, the bush cutting machine 10 is suspended from a shoulder of an operator M via a shoulder strap 12 with an operation lever unit 20 held by hands of the operator M.

Other than the operation lever unit 20, the bush cutting machine 10 includes an engine 13, a cutting blade 14 driven by the engine 13, an operation rod 15 interposed between the engine 13 and the cutting blade 14, a transmission shaft 16 passing through the operation rod 15 for transmitting drive power from the engine 13 to the cutting blade 14, a handle bar 17 mounted to the operation rod 15, and a grip 18 mounted to the handle bar 17.

Figure 2:
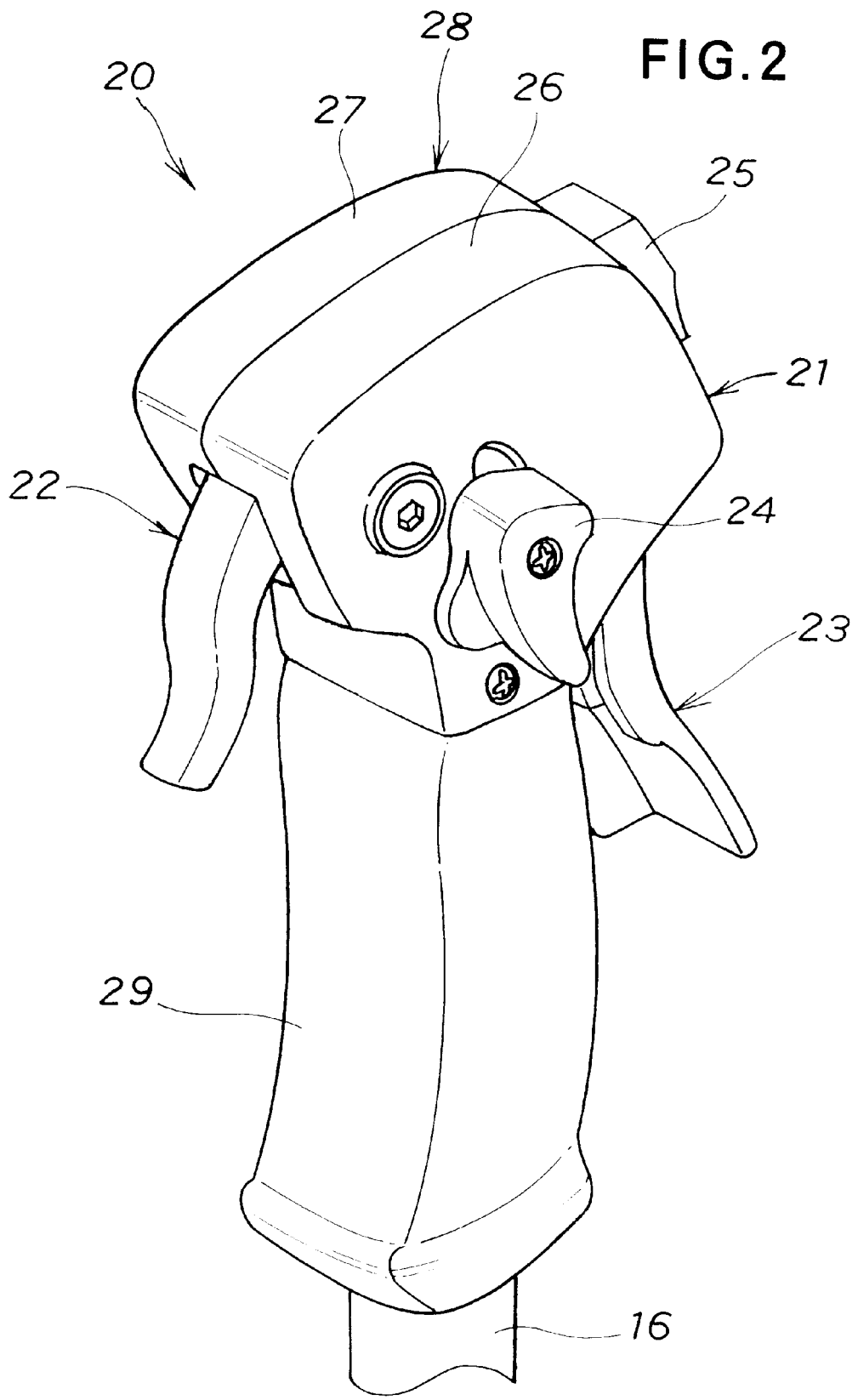
FIG. 2 is a perspective view showing an operation lever unit mounted to the bush cutting machine of FIG. 1.

Referring next to FIG. 2, the operation lever unit 20 comprises a lever case 21, a throttle lever 22, a brake lever 23, a throttle return lever 24, and a kill (operation shutoff) switch 25. The lever case 21 has an upper case 28 and a lower case 29 serving also as a grip portion. The upper case 28 is composed of cup-shaped left and right cases 26, 27. The throttle lever 22 is mounted swingably to the lever case 21 for controlling the rotation speed of the engine 13 (see FIG. 1). The brake lever 23 is also mounted swingably to the lever case 21 for brake controlling the cutting blade 14 (see FIG. 1). The throttle return lever 24 is operatively connected to the throttle lever 22 such that it returns the latter to a throttle close position. The kill switch 25 shuts off the operation of the engine.

Figure 3:
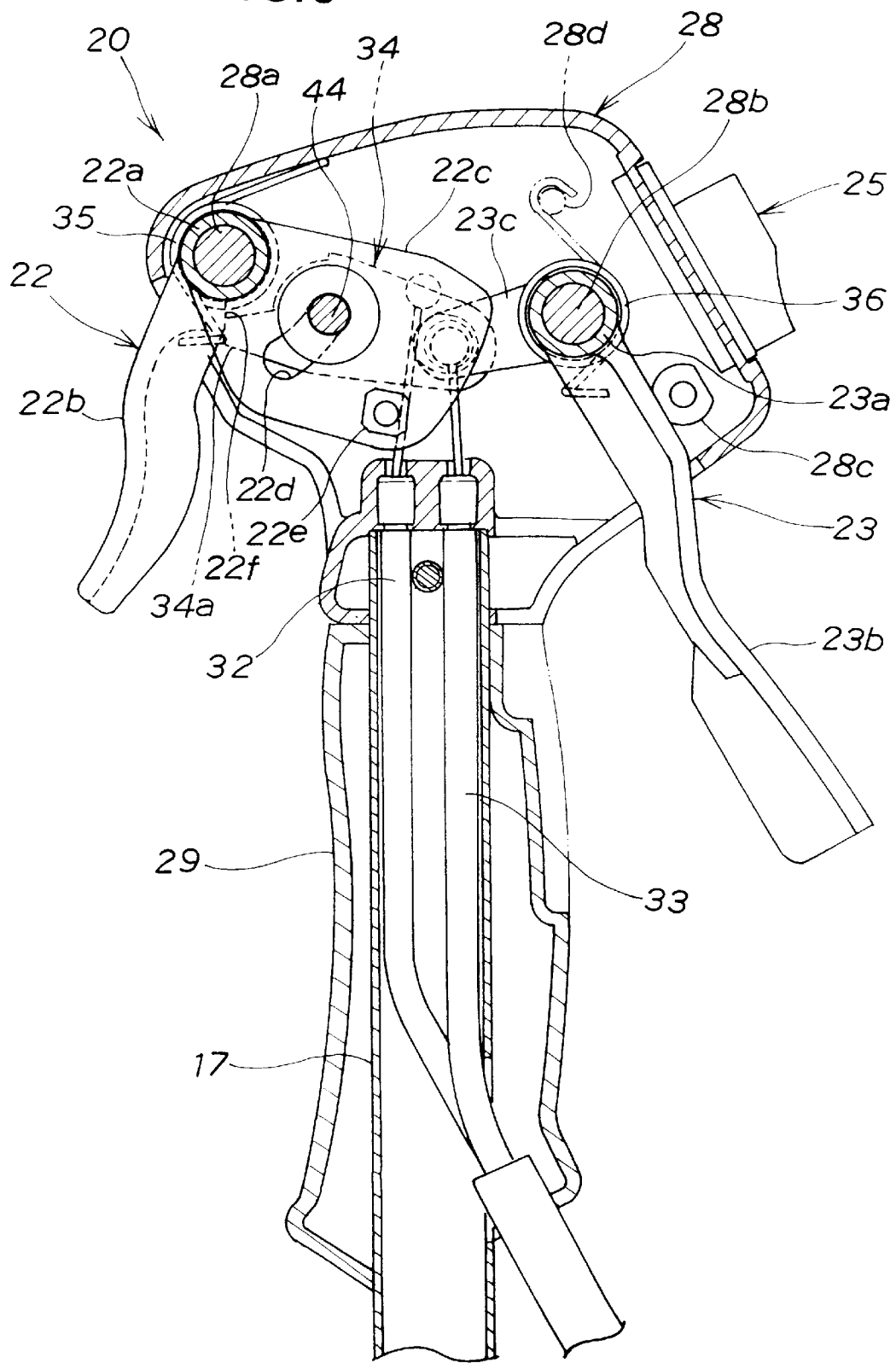
FIG. 3 is a cross-sectional view taken vertically of the operation lever unit of FIG. 2.

As shown in FIG. 3, the operation lever unit 20 comprises a throttle wire 32 connected to an end of the throttle lever 22, a brake wire 33 connected to an end of the brake lever 23, and a cam member disposed between the throttle lever 22 and the brake lever 23.

The throttle lever 22 comprises a cylindrical portion 22a rotatably mounted to a first shaft portion 28a provided on the upper case 28, a lever portion 22b extending outwardly from the cylindrical portion 22a, a generally fan-shaped plate portion 22c extending inwardly from the cylindrical portion 2a, an arcuate, elongate hole 22d, a screw portion 22e with a weld connected nut for securing the throttle return lever 24 (see FIG. 2) to the plate portion 22c via a screw, and an abutment surface 22f disposed on the lever portion 22b for abutting the cam member 34.

The brake lever 23 includes a cylindrical portion 23a attached rotatably to a second shaft portion 28b provided on the upper case 28, a lever portion 23b extending outwardly of the case 28 from the cylindrical portion 23a and an arm portion 23c extending inwardly of the case 28 from the cylindrical portion 23a.

The throttle wire 32 and the brake wire 33 extend from the brake unit 50 (see FIG. 6) disposed proximately to the engine 13 (see FIG. 1), along a side surface of the operation rod 15 and pass through the handle bar 17.

The cam member 34 includes a throttle lever stop 34a which abuts against the abutment surface 22f of the throttle lever 22 to thereby restrict the swinging movement of the throttle lever 22 to open the throttle of the engine 13.

In the upper case 28, a stop 28c is provided for restricting the counterclockwise swinging of the brake lever 23. A torsion coil spring 36 is wound round the cylindrical portion 23a of the second shaft portion 28b, with one end secured to the brake lever 23 and the other end hooked to a spring retainer 28d. The coil spring 36 normally urges the brake lever 23 in a direction for releasing or interrupting the actuation of the brake. A torsion coil spring 35 is wound around the cylindrical portion 22a of the first shaft portion 28a, with one end secured to the lever portion 22b of the throttle lever 22 and the other end held by an inner wall surface of the upper case 28. The coil spring 35 normally urges the throttle lever 22 in a direction for closing the throttle of the engine 13 (see FIG. 1).

Figure 4:
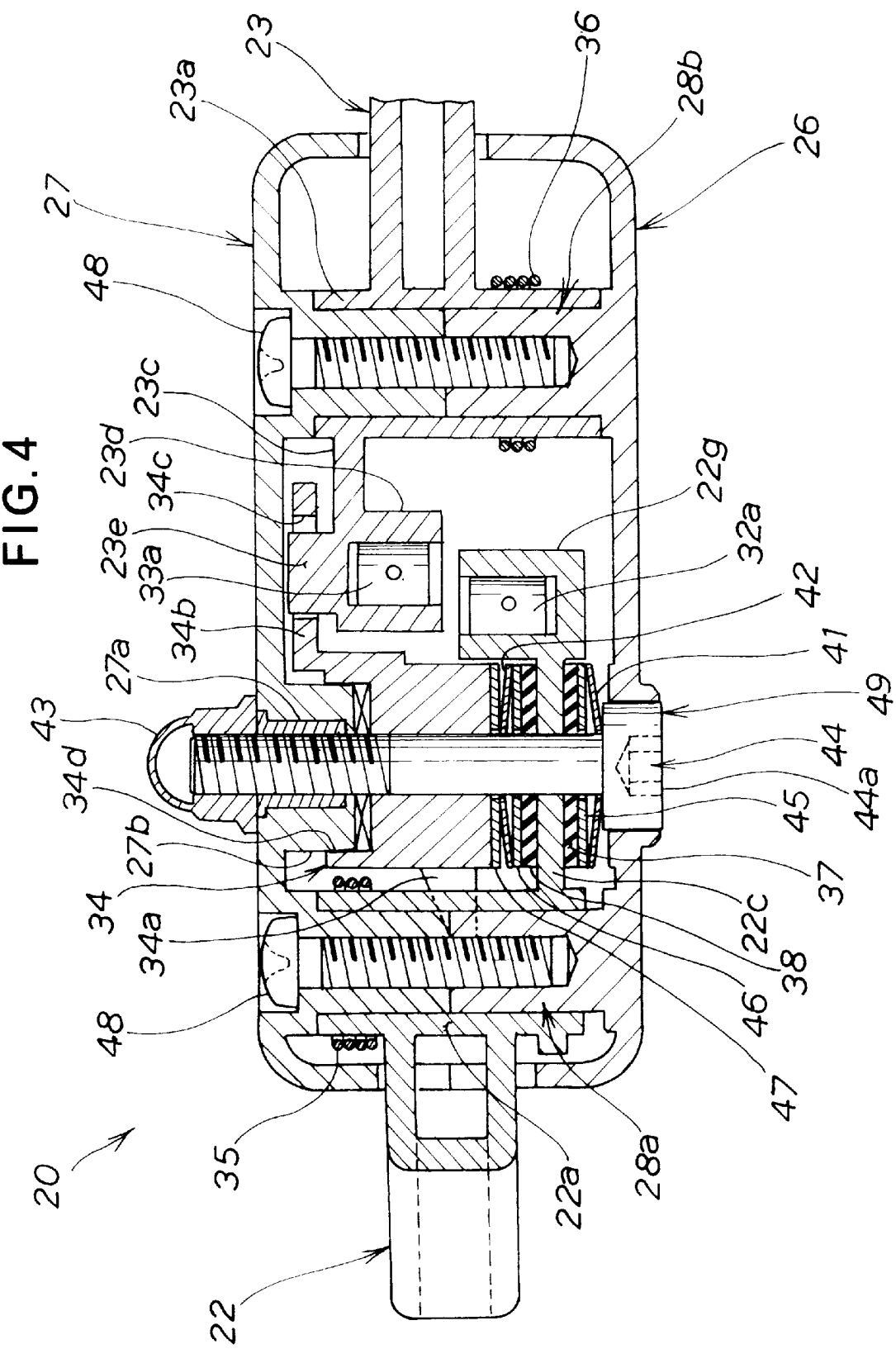
FIG. 4 is a cross-sectional view taken horizontally of the operation lever unit of FIG. 2.

As shown in FIG. 4, friction washers 37, 38 are provided alongside the cam member 34 such that they sandwich the plate portion 22c of the throttle lever 22. The friction washers 37, 38 are urged against the plate portion 22c by coned disc springs 41, 42. These friction washers may be made from rubber. A bolt 44 with a hexagonally-apertured head 44 passes through the cam member 34, friction washers 37, 38 and the coned disc springs 41, 42. The bolt 44 is secured to the right case 27 via a cap nut 43 and a female thread member 27a provided on the right case 27. Reference numerals 45, 46 designate washers disposed respectively between the friction washer 37 and the coned disc spring 41 and between the friction washer 38 and the coned disc spring 42. The washer 47 is disposed between the cam member 34 and the coned disc spring 42. The left and right cases 26, 27 are assembled together by case assembling bolts 48, 48.

The throttle lever 22 has a throttle wire mount portion 22g at an end of the plate portion 22c, to which a wire top anchor 32a of the throttle wire 32 (see FIG. 3) is attached.

At an end of the arm portion 23c, the brake lever 23 has a brake wire mount portion 23d and a column portion 23e. A wire top anchor 33a of the brake wire 33 (see FIG. 3) is attached to the brake wire mount portion 23d.

The right case 27 has a cam portion 27b fitted in a recessed portion 34d formed in the cam member 34. The cam member 34 includes an arm portion 34b having an elongate hole 34c formed therein for receiving the column portion 23e of the brake lever 23 to thereby connect the cam member 34 with the brake lever 23.

The bolt 44 serves as a shaft of the cam member 34. The bolt 44 also works as a press load adjusting member in that it causes the amount of bend or warp of the coned disc springs 41, 42 to vary in correspondence with the amount of turning thereof so as to cause a load produced by the springs 41, 42 to vary so that a load for pressing the friction washers 37, 38 against the plate portion 22c of the throttle lever 22 is varied. Assume that the bolt 44 has a right hand screw thread. When the bolt 44 is turned right, the coned disc springs 41, 42 are largely warped by a head 44a of the bolt 44, thereby providing a large pressing load. Conversely, as the bolt 44 is turned left, the warp of the springs 41, 42 becomes small, thereby producing a small pressing load.

As can be appreciated from the foregoing discussion, a throttle restricting mechanism 49 is comprised of the arm portion 23c of the brake lever 23, column portion 23e, cam member 34, cam portion 27b of the right case 27, friction washers 37, 38, coned disc springs 41, 42, and the bolt 44.

Figure 5:
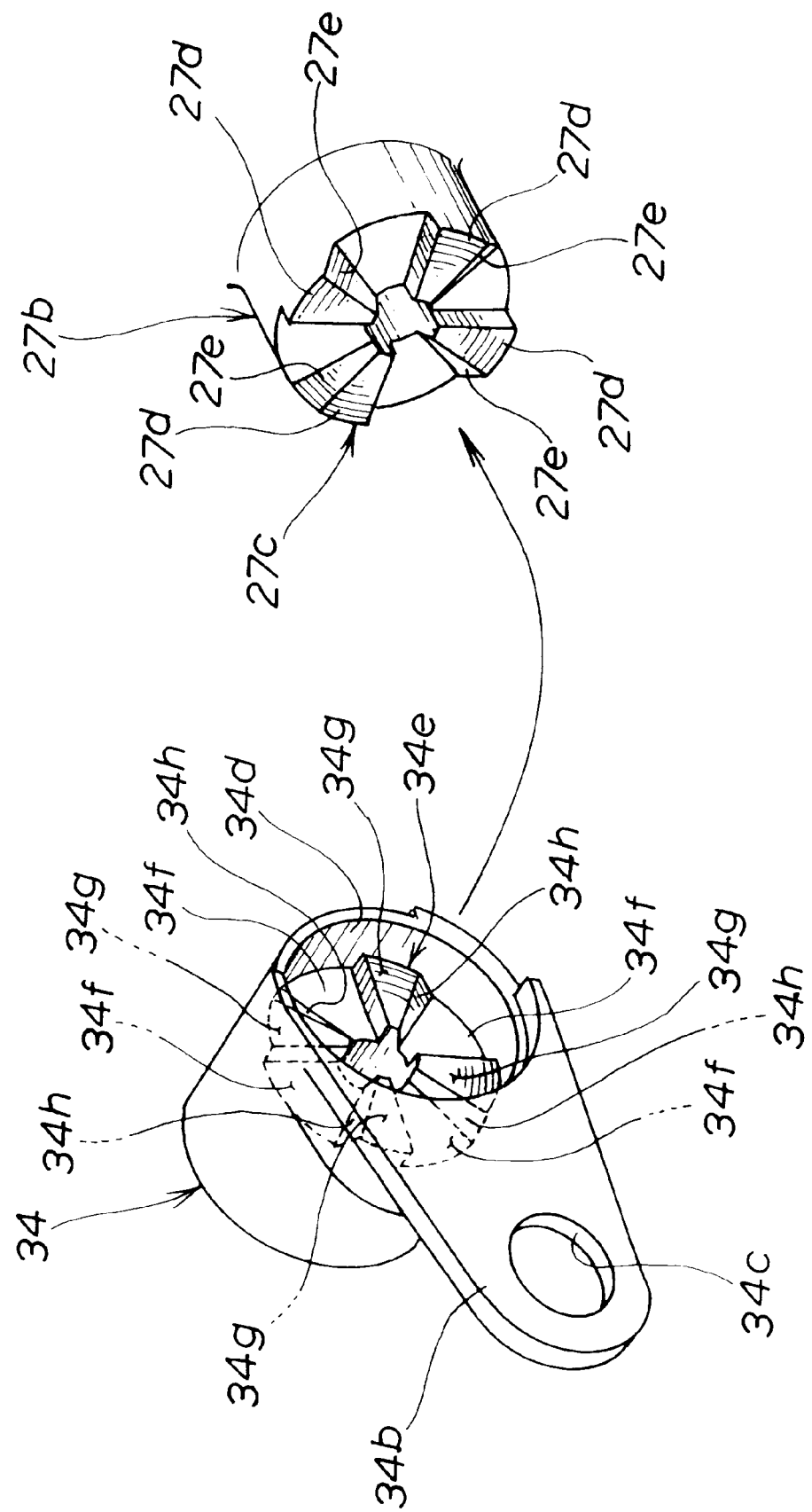
FIG. 5 is a perspective view showing cam portions of a cam member and a handle case forming the operation lever unit of FIG. 4.

In FIG. 5, the cam member 34 and the cam portion 27b of the lever case 21 are shown in perspective. The cam portion 27b of the lever case 21 (see FIG. 2) a plurality of cam ridges 27d on a cam surface 27c thereof. The cam ridges 27d have respective slopes or inclined surfaces 27e.

At the bottom of a recessed portion 34d, the cam member 34 has a cam surface 34e for contacting the cam surface 27c of the cam portion 27b. The cam surface 34e includes a plurality of cam grooves 34f meshing with the cam ridges 27d of the cam portion 27b and a plurality of flat surfaces 34g. Each cam groove 34f has slopes or inclines surfaces 34h.

When the cam member 34 is rotated relative to the cam portion 27b, it moves axially relative to the cam portion 27b because the inclined surface 27e of the cam portion 27b and the inclined surface 34h of the cam member 34 make a sliding contact with each other. That is, rotation of the cam member 34 causes the same to move axially (vertically in FIG. 4) of the bolt 44.

Figure 6:
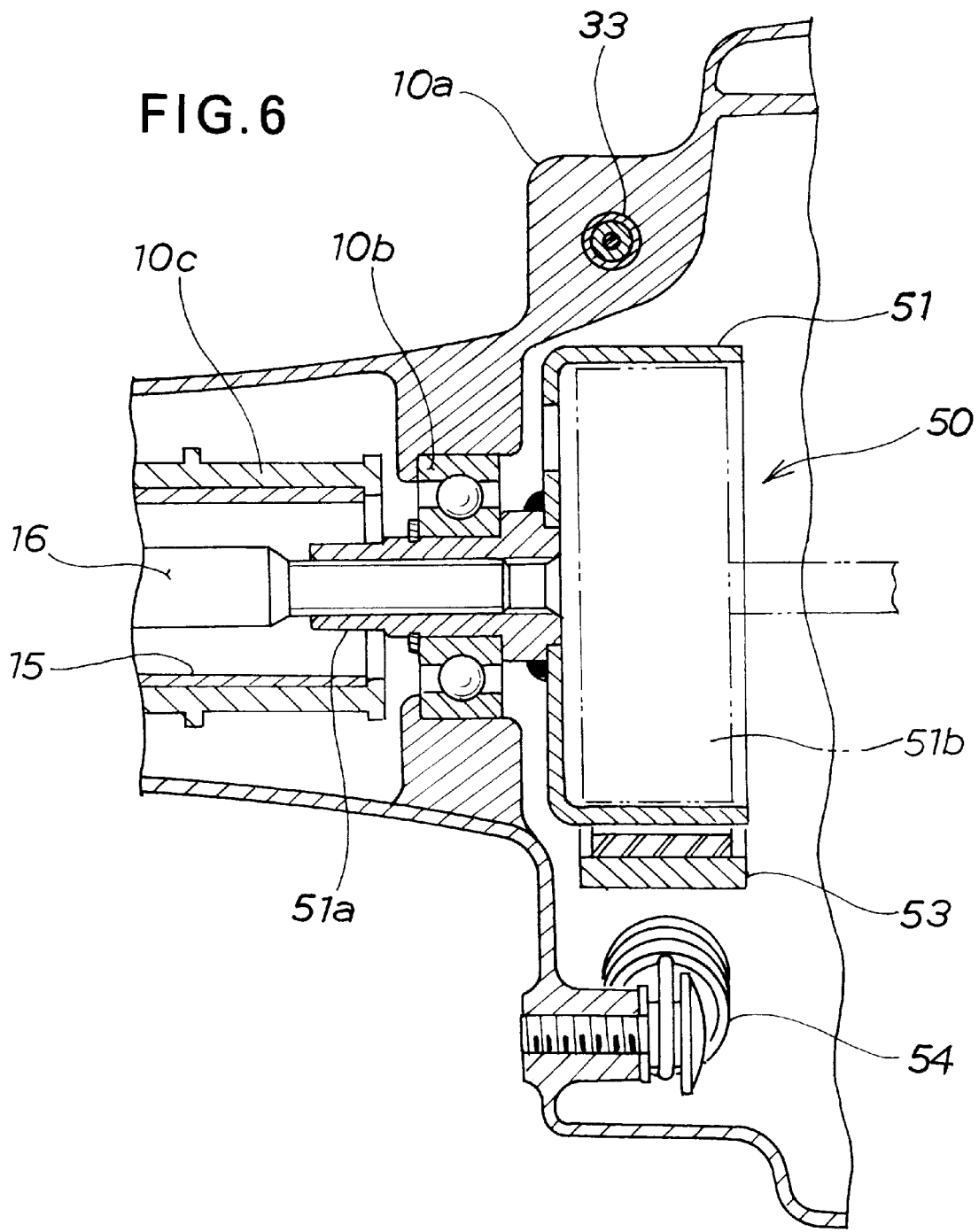
FIG. 6 is a cross-sectional view taken along line 6—6 of FIG. 1, showing on an enlarged scale a brake unit.

Reference is made next to FIG. 6 which show the brake unit 50 provided within the clutch case mounted to a frontal part of the engine 13 (FIG. 1).

Brake drum 51 forming part of the brake unit 50 is connected to the transmission shaft 16 via a shaft portion 51a mounted to a frontal part thereof. The shaft portion 51a is supported by a clutch case 10a via a bearing lob. A proximal end of the operation rod 15 is mounted to an operation rod mount member 10c. The drum 51 is positioned on a driven side and encloses a centrifugal clutch 51b disposed between the engine 13 and the transmission shaft 16 for connecting and disconnecting drive power from the engine 13.

Figure 7:
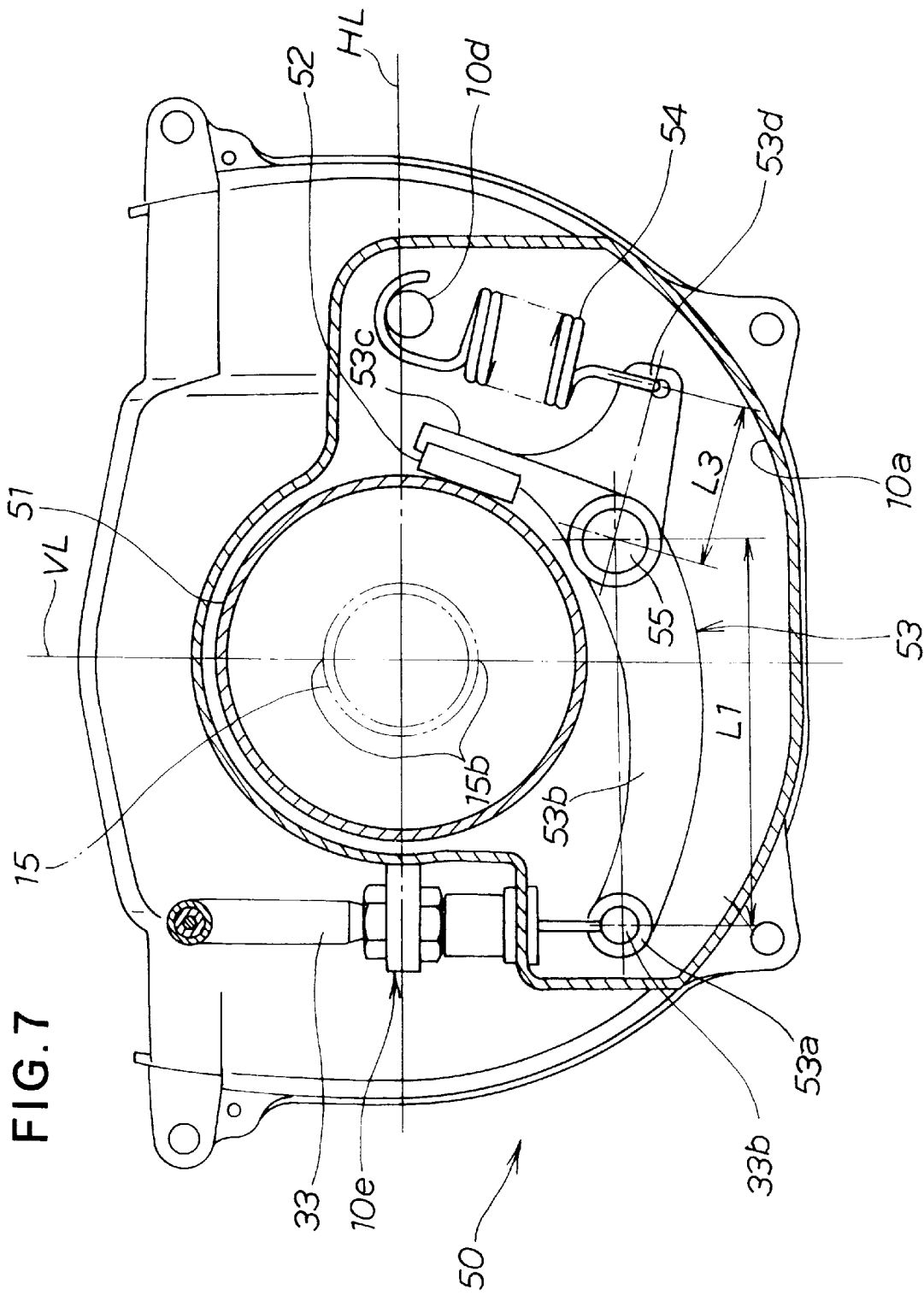
FIG. 7 is a cross-sectional view taken along line 7—7 of FIG. 1, showing on an enlarged scale the brake unit.

In FIG. 7, the brake unit 50 provided forwardly of the engine 13 (FIG. 1) is shown in a braking condition. The brake unit 50 is comprised of the brake drum 51, a brake shoe 52 for stopping rotation of the cutting blade 14 (FIG. 1) by pressing against the drum 51, a brake arm 53 for moving the brake shoe 52, the brake wire 33 connected to a top end of the brake arm 53, a tension coil spring 54 for producing a load for pressing the brake shoe 52 against the drum 51, and the brake lever 23 (FIG. 3). Desirably, a contact surface of the brake shoe 52 is lined with a friction material.

The brake arm 53 is swingably attached to a brake arm shaft 55 mounted to the clutch case 10a. The brake arm 53 is comprised of a first arm portion 53b extending from the brake arm shaft 55 to a brake wire mount portion 53a connecting the brake wire 33, a second arm portion 53c extending from the brake arm shaft 55 to the mount portion of the brake shoe 52, and a third arm portion 53d extending from the brake arm shaft 55 to the mount portion of the tension coil spring 54. The brake arm 53 has a generally Y-shaped configuration with the second and third arm portions 53c, 53d brought close to each other.

Value of L1/L3, which is a ratio of the length of the first arm portion 53b of the brake arm 53, that is, distance L1 from the brake arm shaft 55 to the brake wire mount portion 53a, to the length of the third arm portion 53d, that is, distance L3 from the brake arm shaft 55 to the mount portion of the tension coil spring 44, is set to be larger than 2.

The brake arm shaft 55 is disposed to the operator's side (right side of FIG. 7) of a vertical center line VL of the operation rod 15 and below a horizontal center line HL of the operation rod 15.

One end of the tension coil spring 54 is attached to the third arm portion 53d while the other end of the spring 54 is hooked onto a spring retainer 10d. The coil spring 54 normally urges the brake shoe 52 to press against the brake drum 51. Reference numeral 10e designates a brake wire support portion for supporting the brake wire 33. Distal end of the brake wire 33 is secured to a wire top anchor 33b provided on a distal end of the first arm portion 53b of the brake arm 53.

By forming the brake arm 53 into a generally Y-shaped configuration as discussed above, it becomes possible to make the brake unit 50 compact, thereby rendering the bush cutting machine 10 small.

When the value of the ratio of the length L1 of the first arm portion 53b to the length L3 of the third arm portion 53d is set to be 2 or smaller, a large force is required to operate the brake lever 23 (see FIG. 3). As a result, a large physical fatigue arises in an operator's hand gripping the brake lever 23. However, in the embodiment just described, the value of the above-mentioned ratio is set to be larger than 2 so that a smaller force is required to operate the brake lever 23, thereby reducing the physical fatigue to arise in the operator's hand.

Further, since the brake arm shaft 55 is located downwardly of the horizontal center line HL of the operation rod 15, it becomes possible to position the brake shoe 52 and the brake arm 53 downwardly of the operation rod 15. This makes it possible to lower the center of gravity of the bush cutting machine 10.

In addition, since the brake arm shaft 55 is positioned to the operator's side of the vertical center line VL of the operation rod 15, it becomes possible to make the brake arm 53 extend deep into a side (left side of the vertical center line VL) opposite from the operator's side. As a result, the brake lever 23 (FIG. 3) can be operated with a small operational force.

Positioning of the brake wire 33 is exemplified in FIG. 8. Most part of the brake wire 33 (portion between the brake unit 50 and the handle bar 17) is disposed alongside an outer surface 15a such that it extends longitudinally of the operation rod 15 along an outer side surface 15b in an adjoined fashion, which outer side surface 15b is located in the opposite side of the vertical center line VL (see FIG. 7) remote from the operator's side. That is, the brake wire 33 is mostly positioned on one side of a center line S of the operation rod 15 opposite from the side of the operator M. This arrangement makes it possible to prevent the brake wire 33 from being touched by an arm and body of the operator M, thereby avoiding obstruction of bush cutting operations by the wire.

Turning back to FIG. 3, an operation of the operation lever unit 20 will now be discussed. The engine 13 is started without gripping the brake lever 23. At this time, the throttle lever 22 is restricted to its throttle-close position by the cam member 34. Thus, the engine 13 is placed in an idle state. The brake unit 50 is in a braking state with the brake shoe 52 pressed against the brake drum 51, as shown in FIG. 7. Consequently, the cutting blade 14 (FIG. 1) does not operate despite the engine 13 started.

For starting a cutting operation, the brake lever 23 is gripped such that it is held against a palm of a hand H. Gripping the brake lever 23 causes its arm portion 23c to rotate clockwise about the second shaft portion 28b. As a result, the arm portion 23c pulls up the brake wire 33 in a direction shown by an arrow.

At this time, the column portion 23e of the arm portion 23c shown in FIG. 4 is fitted in the elongate hole 34c formed in the arm portion 34b of the cam member 34. Thus, in response to the rotation of the arm portion 23c shown in FIG. 9A, the cam member 34 rotates counterclockwise about the bolt 44 as shown by an arrow. As a result, the throttle lever stop 34a of the cam member 34 is released from the abutment surface 22f of the throttle lever 22, thereby freeing the throttle lever 22 from its positional restriction. This makes the throttle lever 22 rotatable.

Figure 9A:
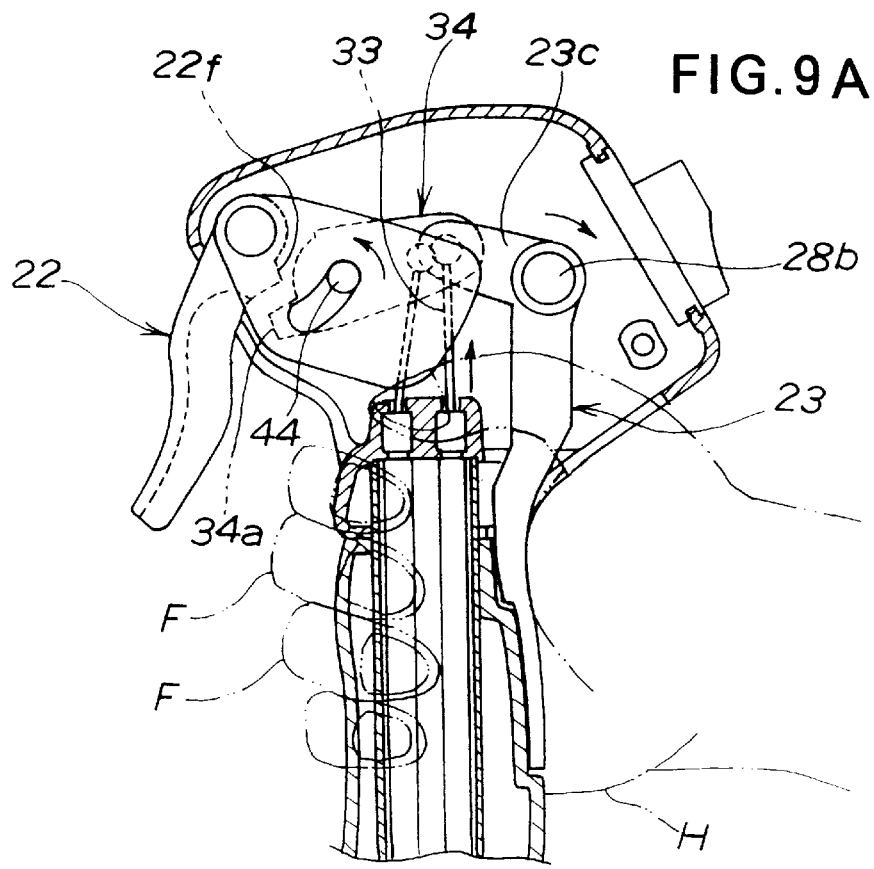
FIGS. 9A and 9B correspond respectively to FIGS. 3 and 4 but illustrate an operation of the brake unit.
Figure 9B:
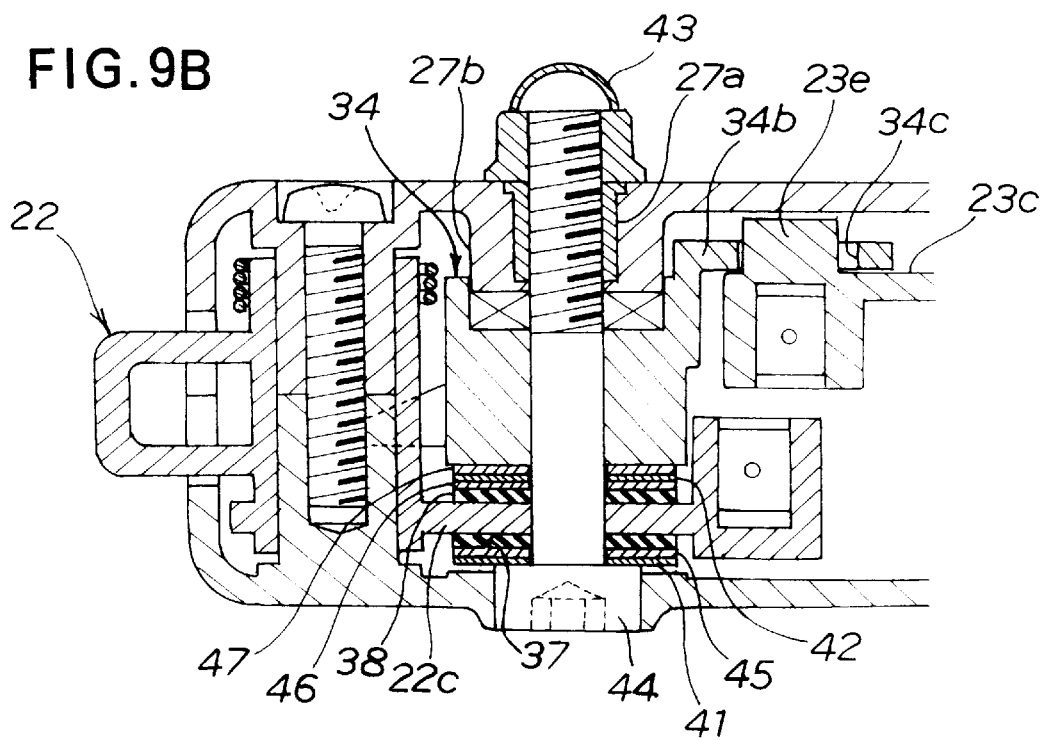

Referring now to FIG. 9B, upon rotation, the cam member 34 moves axially with respect to the cam portion 17b as explained with reference to FIG. 5. As a result, the coned coil springs 41, 42 are bent into flat sheet forms as shown in FIG. 9B. Consequently, the plate portion 22c of the throttle lever 22 is pressed by the friction washers 37, 38, thereby producing a large frictional force between the plate portion 22c and the friction washers 37, 38 for restricting the swinging movement of the throttle lever 22.

When the operational force for the throttle lever 22 is too large, the bolt 44 is turned to decrease the amount of bend of the coil springs 41, 42 so that the frictional force between the plate portion 22c and the friction washers 37, 38 becomes smaller. The operational force can be regulated in this manner.

Figure 10:
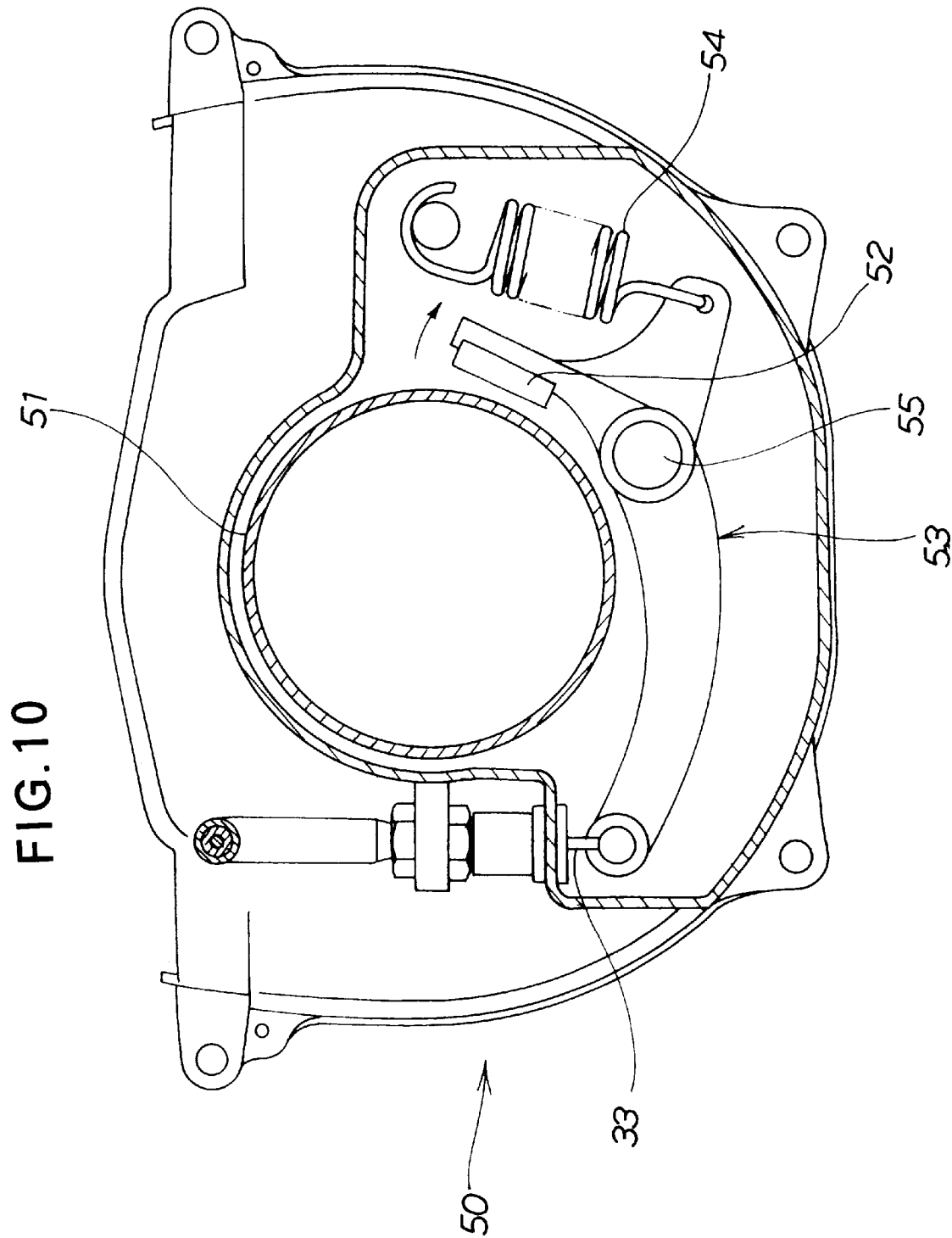
FIG. 10 illustrates an operation of the brake unit of FIG. 7.

As the brake wire 33 is pulled by the arm portion 23c of the brake lever 23 shown in FIG. 9A, the brake arm 53 shown in FIG. 10 rotates clockwise about the brake arm shaft 55 against the tensioning force of the tension coil spring 54. As a result, the brake shoe 52 moves away from an outer peripheral surface of the brake drum 51, thereby releasing the braking. The cutting blade 14 is now placed in an operable state.

Discussion will be made next as to an altered form of the brake unit according to the embodiment described above, with reference to FIG. 11. Like reference numerals will be used for parts corresponding to those of FIG. 7 and their detailed discussion will be omitted.

Brake unit 60 comprises a brake drum 51, a brake shoe 52, a brake arm 63 for bringing the brake shoe 52 into and out of contact with an outer peripheral surface of the brake drum 51, a brake wire 33 connected to a proximal end of the brake arm 63, a tension coil spring 54 mounted to a distal end of the brake arm 63, and a brake lever 23 (see FIG. 3).

The brake shoe 52 is provided at a position remote from the operator M (FIG. 1) past a vertical center line VL of the operation rod 15 and below a horizontal center line HL of the operation rod 15. That is, the brake shoe 52 is provided in a lower left sectorial region defined by the vertical center line VL and the horizontal center line HL passing over the center of the operation rod 15.

The brake arm 63 is rotatably attached to a brake arm shaft 65 which is in turn attached to a clutch case 60a positioned at a front part of the engine 13. The brake arm 63 is composed of a first arm portion 63b extending from the brake arm shaft 65 to a brake wire mount portion 63a to which the wire 33 is attached, a second arm portion 63c extending from the brake arm shaft 65 to the mount portion of the brake shoe 52, and a third arm portion 63d extending from the brake arm shaft 65 to the mount portion of the tension coil spring 54. The brake arm 63 has a generally Y-shaped configuration as a result of the second arm portion 63c and the third arm portion 63d arranged closely about the brake arm shaft 65 into a V-shaped formation.

The brake wire mount portion 63a is disposed remotely from the operator M (on the right side of the figure) past the vertical center line VL of the operation rod 15 (on the left side of the figure).

The brake wire 33 connected to the brake wire mount portion 63a is lead out from that part of the clutch case 60a which is remote from the operator M (on the right side of the figure) past the vertical center line VL of the operation rod 15, and is positioned on that side of the outer side surface 15b which is remote from the operator M past the vertical center line VL of the operation rod 15.

The brake arm shaft 65 is provided at a position (on the left side of the figure) which is remote from the operator M past the vertical center line VL of the operation rod 15 and below the horizontal center line HL of the operation rod 15.

Figure 11:
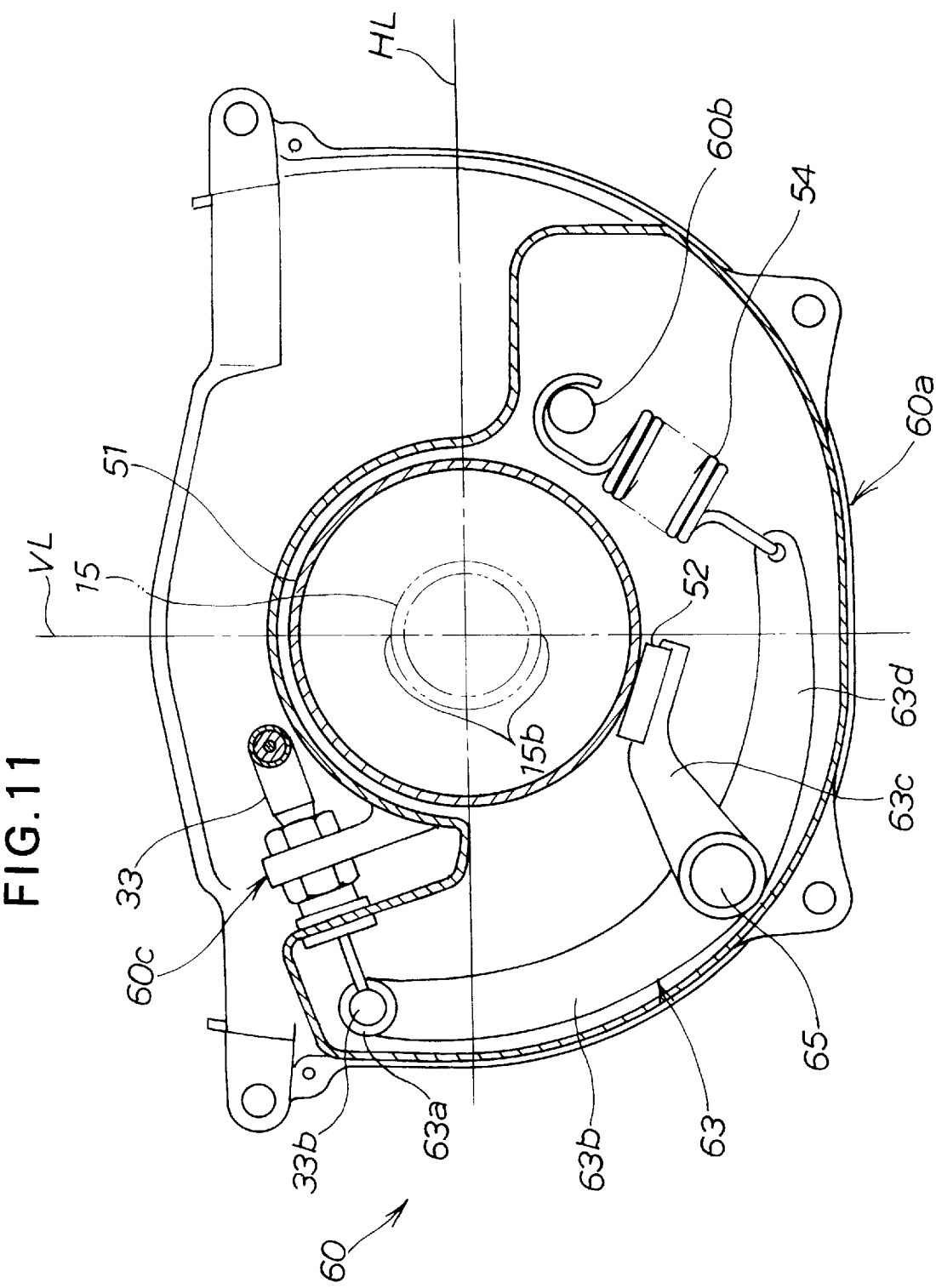
FIG. 11 is a cross-sectional view illustrating an alteration of the brake unit of FIG. 7.

In FIG. 11, reference numeral 33b designates a wire top anchor. 60b designates a spring retainer for hooking one end of the tension coil spring 54. Designated by reference numeral 60c is a brake wire support portion for supporting the brake wire 33.

In the brake unit 60 according to the altered embodiment described above, when an operator's hand is removed from the brake lever 23 for interrupting or terminating a bush cutting operation, heat and sound are produced by braking with the brake shoe 52 the brake drum 51 connected to the cutting blade 4 (see FIG. 1) rotating under inertia. However, since the brake shoe 52 is positioned remotely from the operator M past the vertical center line VL of the operation rod 15 and downwardly of the horizontal center line HL, the operator M will not be harmed by such heat and sound.

The brake units 50, 60 according to the present embodiment and its alteration can be applied to other machines such as a lawn mower, a hedge trimmer or the like wherein the brake drum 51 is pressed by the brake shoe 52 attached to the brake arm 53.

Figure 12:
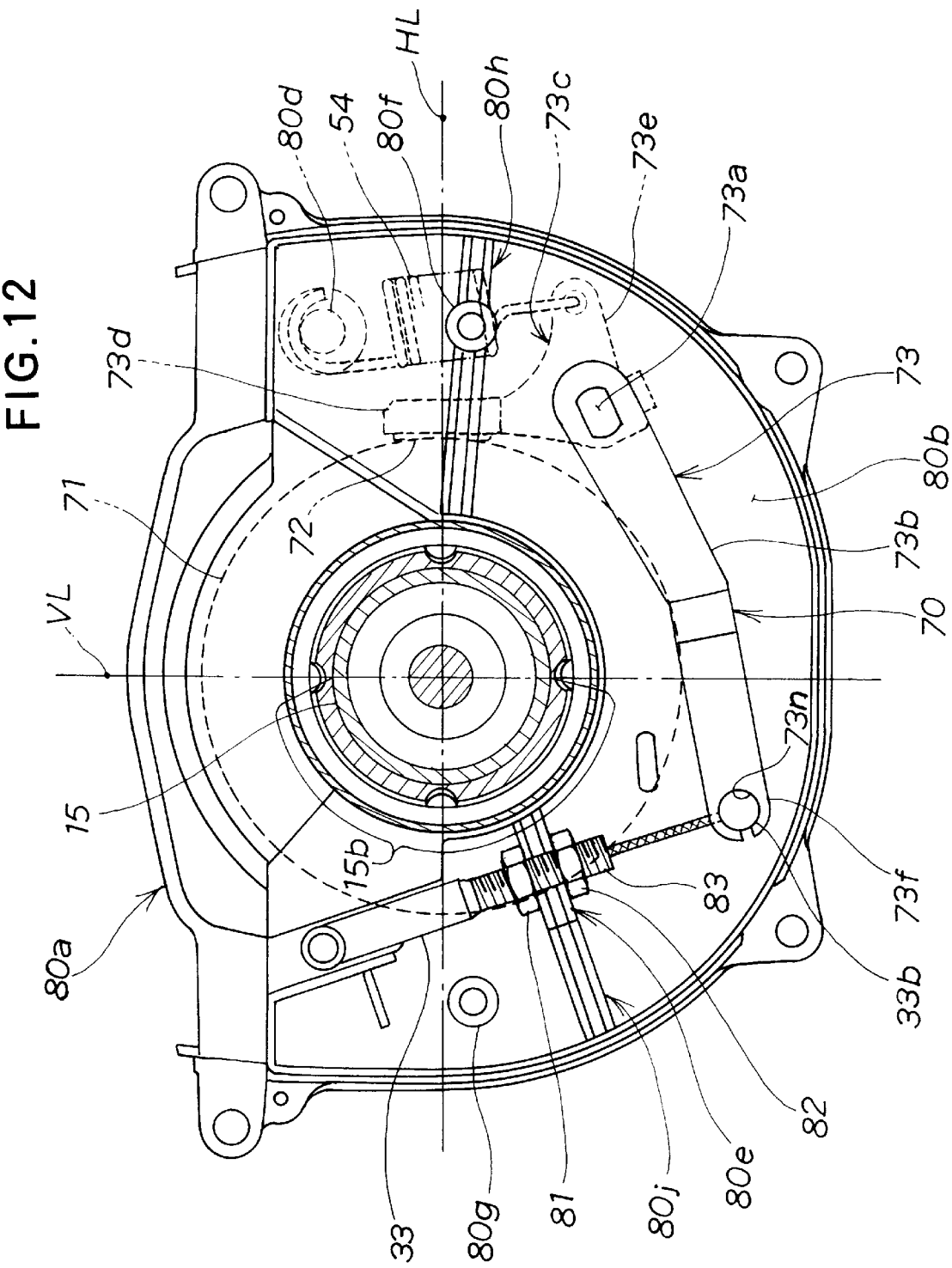
FIG. 12 is a cross-sectional view similar to FIG. 7 but illustrates a separate embodiment of the brake unit.

Brake unit 70 according to a separate embodiment will now be discussed with reference to FIG. 12. The brake unit 70 is attached to a clutch case 80a which is attached to a front part of the engine 13. FIG. 12 shows a state in which a brake cover 85 (FIG. 13) described below is removed from the front part of the clutch case 80a.

The brake unit 70 comprises a brake drum 71, a brake shoe 72 for stopping rotation of the cutting blade 14 by press contacting an outer peripheral part of the brake drum 71, a brake arm 73 for retaining the brake shoe 72, a brake wire 33 connected to a proximal end of the brake arm 73, a tension coil spring 54 for producing a frictional force for braking the brake drum 71 by pressing the brake shoe 72 against the drum 71, a brake cover 85 (FIG. 13) to be discussed below, and a brake lever 23.

The brake arm 73 comprises a brake arm shaft 73a rotatably attached to a front wall 80b forming a side wall of the clutch case 80a, a first arm portion 73b fitted with the arm shaft 73a immovably, and an inner arm portion 73c positioned internally of the clutch case 80a and attached to the brake arm shaft 73a. The inner arm portion 73c has a second arm portion 73d and a third arm portion 73e.

The first arm portion 73b has a brake wire mount portion 73f for connecting the brake wire 33. The second arm portion 73d extends from the brake arm shaft 73a to the mount portion of the brake shoe 72. The third arm portion extends from the brake arm shaft 73a to the mount portion of the tension coil spring 54. The brake arm shaft 73a is positioned on the operator's side (rightwardly) of the vertical center line VL of the operation rod 15 and below the horizontal center line HL of the rod 15.

The tension coil spring 54 is disposed between the third arm portion 73e and a spring retainer 80d. The brake wire 33 is attached through a male thread portion 83 to a brake wire support portion 80e via nuts 81, 82.

Figure 13:
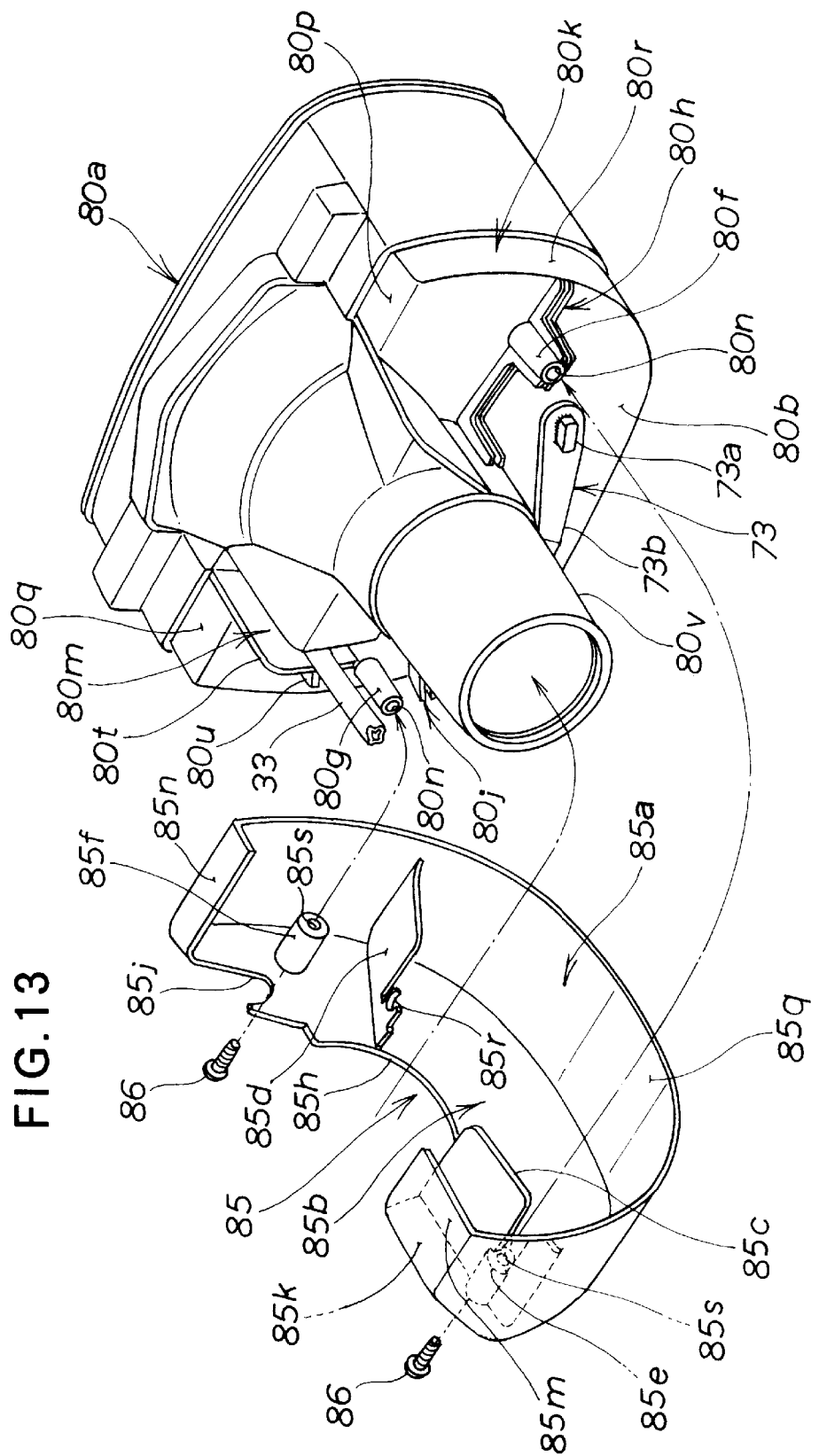
FIG. 13 is an exploded perspective view showing a clutch case and a brake cover forming the brake unit of FIG. 12.

In FIG. 13, the clutch case 80a and the brake cover 85 are shown in perspective. The brake cover 85 is attached to a front part of the clutch case 80a. The brake cover is desirably formed from a synthetic resin, iron, aluminum or the like.

The clutch case 80a includes brake cover mount portions 80f, 80g projecting from the front wall 80b, cover insert grooves 80h, 80j for inserting part of the brake cover 85, a case stepped portion 80k for fitting the brake cover 85, and a wire insert slit 80m for inserting the brake wire 33. In the brake cover mount portions 80f, 80g, mount holes 80n, 80n are formed for threadedly receiving screws 86, 86.

At a thicknesswise center of the cover insert grooves 80h, 80j, insert grooves are formed. One cover insert groove 80h is formed integrally with the brake cover mount portion 80f. The other cover insert groove 80j is formed integrally with the brake wire support portion 80e shown in FIG. 12.

The case stepped portion 80k comprises left and right end surfaces 80p, 80q formed at frontal upper portions of the clutch case 80a, and a curved portion 80r located downwardly of the case 80a. The wire insert slit 80m is defined by a wire side wall 80t rising from the front wall 80b. The wire side wall 80t is reinforced by a reinforcing wall 80u.

The brake cover 85 comprises an arc-shaped bottom 85a, a side wall portion 85b rising from an edge of the bottom 85a, projection plates 85c, 85d attached to the bottom 80a and the side wall portion 85b and projecting in an opening direction, and boss portions 85e, 85f for connecting the brake cover 85 to the clutch case 80a.

The side wall portion 85b comprises a fitting portion 85h arcuately cut away for receiving a cylindrical portion 80v projecting forwardly from the clutch case 80a, a wire passage 85j for allowing passage of the wire 33, and an inclined portion 85k with its upper part inclined backwardly. The bottom 85a comprises left and right upper surfaces 85m, 85n for fitting respectively with the left and right end surfaces 80p, 80q of the clutch case 80a, and a curved portion 85q for fitting with the curved portion 80r.

The projection plates 85c is formed integrally with the boss portion 85e and inserted into the cover insert groove 80h of the clutch case 80a. The projection plate 85d has a wire top support portion 85r for supporting a top or distal end of the brake wire 33 and is inserted into the cover insert groove 80j of the clutch case 80a.

The boss portions 85e, 85f have through-holes 85s, 85s formed therein. The screws 86, 86 are passed through the through-holes 85s, 85s and threadedly engaged in the mount holes 80n, 80n formed in the brake cover mount portions 80f, 80g to thereby attach the brake cover 85 to the clutch case 80a.

Upon attachment of the brake cover 85 to the clutch case 80a, the projection plates 85c, 85d are engaged in the cover insert grooves 80h, 80j. Thus, the projection plates 85c, 85d function as a protection cover for protecting the brake arm 73 mounted to a lower part of the front wall 80b of the clutch case 80a from raindrops and dust. This reduces the friction resulting from dust entered into the brake arm shaft 73a forming the brake unit 70 shown in FIG. 12, the front wall boss portions 80y (FIG. 14) for supporting the brake arm shaft 73a, the brake wire mount portion 73f (specifically an anchor fitting hole 73n) of the first arm portion 73b, and into the wire top anchor 33b of the brake wire 33.

FIG. 14 is a view similar to FIG. 6 but illustrates the brake unit 70 according to the separate embodiment. The brake drum 71 is connected to the transmission shaft 16 for driving the cutting blade 14 (FIG. 1) through the shaft portion 71a attached to the front part of the drum 71. The drum 71 encloses the centrifugal clutch 71b on a driven side for connecting and disconnecting the drive power between the engine 13 and the transmission shaft 16. The shaft portion 71a is rotatably attached to the clutch case 80a by means of a bearing 80w. The clutch case 80a has an operation rod mount member 80x extending forwardly for mounting the operation rod 15. On the front wall 80b of the clutch case 80a, a front wall boss portion 80y is provided for rotatably attaching the brake arm shaft 73a to the clutch case 80a.

In FIG. 15, the brake unit 70 of FIG. 12 is illustrated in exploded perspective. In this figure, the brake lever 23 (FIG. 3) and the brake cover 85 (FIG. 13) forming the brake unit 70 are omitted for clarity. The first arm portion 73b is weld connected to the brake arm shaft 73a. The distal end of the brake arm shaft 73a is attached to the inner arm portion 73c via a screw 87. The brake shoe 73 for pressing against the peripheral surface of the brake drum 71 is attached to the second arm portion 73d of the inner arm portion 73c. One end of the tension coil spring 54 is lockingly engaged with the third arm portion 73e of the inner arm portion 73c, whilst the other end of the spring 54 is retained by the spring retainer 80d provided on the clutch case 80a. The wire top anchor 33b of the brake wire 33 is attached to the brake wire mount portion 73f provided at the distal end of the first arm portion 73b. For attachment, the wire top anchor 33b is engaged in the anchor fitting holes 73n, 73n.

Distal end of the brake arm shaft 73a has a flat surfaced portion 73h with upper and lower parts cut away to present a flattened configuration. The flat surfaced portion 73h has a female thread portion 73j for threaded engagement with the screw 87. The flat surface portion 73h is inserted into an arm connecting hole 73k formed in the inner arm portion 73c for connecting the brake arm shaft 73a and the inner arm portion 73c together by means of the screw 87. Reference numeral 73m designates a spring engaging hole for locking one end of the tension coil spring 54.

Discussion will be made next as to a maintenance operation on the brake unit 70 according to the separate embodiment described above, with reference to FIGS. 16A and 16B.

Figure 16A:
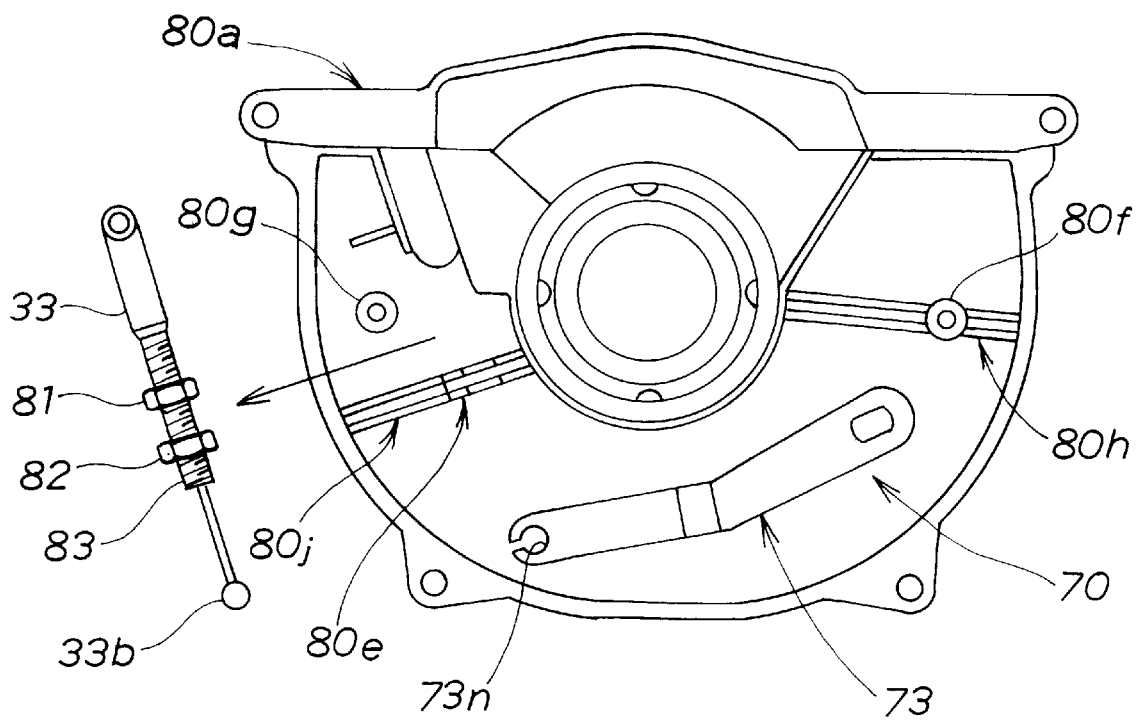
FIGS. 16A and 16B illustrate operations for changing and adjusting a play of a brake wire in the brake unit according to the separate embodiment shown in FIG. 12.

Referring to FIG. 16A, for changing the brake wire 33, the brake cover 85 (FIG. 13) is firstly removed from the clutch case 80a. Next, the nuts 81, 82 at the top part of the brake wire 33 are untightened to release the male thread portion 83 from the brake wire support portion 80e. Then, the wire top anchor 33b of the brake wire 33 is pulled out from the anchor fitting hole 73n of the brake arm 73. By just removing the clutch cover 80a from the brake cover 85 (FIG. 13) in this manner, the nuts 81, 82 and the wire top anchor 33b are exposed to the outside of the clutch case 80a, thereby enabling easy removal of the brake wire 33.

Figure 16B:
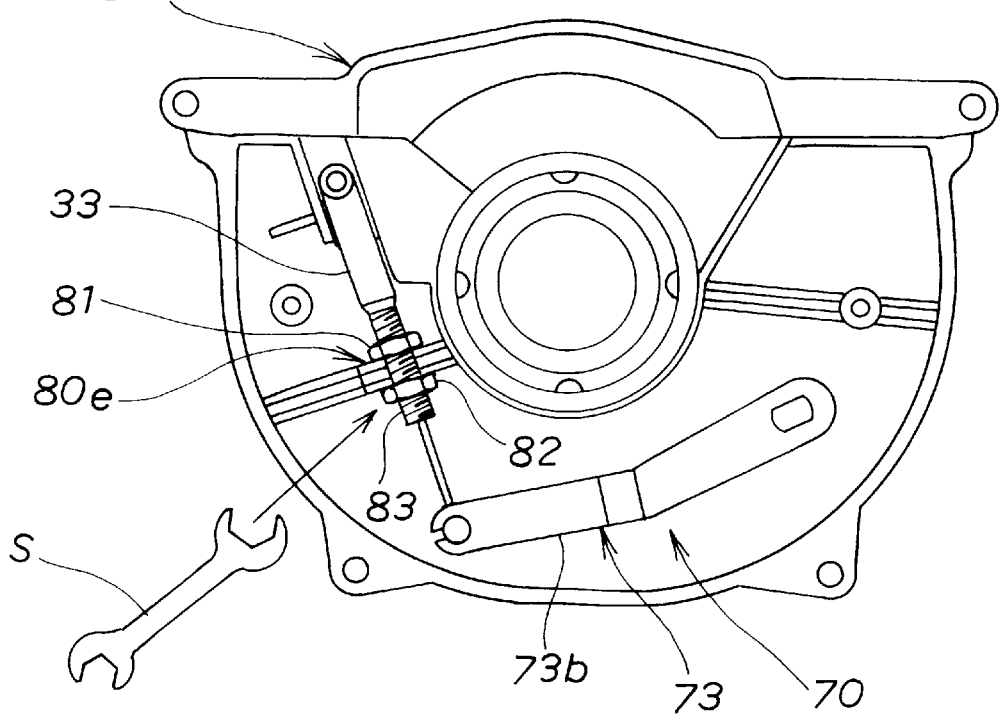

Adjustment of a play in the brake wire 33 will be discussed next with reference to FIG. 16B. Where the brake wire 33 stretched, the brake shoe 72 will not be sufficiently pulled away from the outer peripheral surface of the brake drum 71 shown in FIG. 12 even when the brake lever 23 (FIG. 9A) is gripped. As a result, during a bush cutting operation, the brake unit 70 comes into a braking state with the brake lever 23 slightly returned or released. Therefore, the play in the brake wire 33 needs to be adjusted so that a sufficient distance is provided between the brake drum 71 and the brake shoe 72 upon gripping of the brake lever 23.

For achieving the play adjustment, the nut 82 threadedly engaged in the male thread portion 83 formed at an end of the brake wire 33 is untightened by a spanner (wrench) S to move the nut 82 toward the distal end of the brake wire 33. Then, the brake wire 33 is moved away from the first arm portion 73b within the limited range in which the brake shoe 72 remains in contact with the peripheral surface of the brake drum of FIG. 12. Thereafter, the nut 81 is turned by the spanner S to be moved toward the distal end of the brake wire 33. Continuously, the nut 81 is turned to be tightened to thereby re-mount the brake wire 33 to the brake wire support portion 803. This completes the play adjustment of the brake wire 33.

In the present embodiment described above, the brake unit 70 has the brake arm shaft 73a fixedly secured to the first arm portion 73b, and the second and third arm portions 73d, 73e detachably secured to the distal end of the brake arm shaft 73a. Alternatively, the distal end of the brake arm shaft 73 may be fixedly secured to the second and third arm portions 73d, 73e. Similarly, the first arm portion 73b may be detachably secured to the proximal end of the brake arm shaft 73a.

Obviously, various minor changes and modifications of the present invention are possible in the light of the above teaching. It is therefore to be understood that within the scope of the appended claims, the present invention may be practiced otherwise than as specifically described.

What is claimed is:

1. A hand-held, engine-powered bush cutting machine comprising:
   a clutch case mounted to a front part of an engine;
   an operation rod extending forwardly from the clutch case;
   a cutting blade mounted to undergo rotation at a distal end of the operation rod;
   a brake lever connected to the operation rod;
   a transmission shaft driven by drive power transmitted from the engine, the transmission shaft extending through the operation rod for transmitting the drive power to the cutting blade;
   a centrifugal clutch housed in the clutch case for connecting and disconnecting the drive power transmitted to the transmission shaft from the engine;
   a brake drum disposed on a side of the centrifugal clutch proximate to the transmission shaft for braking rotation of the cutting blade;
   a brake arm pivotally mounted to a front wall of the clutch case proximate to the brake drum;
   a support shaft for pivotally connecting the brake arm to the front wall of the clutch case;
   a brake shoe connected to a first end of the brake arm for contacting an outer peripheral surface of the brake drum with a predetermined pressure; and
   a brake wire connected to a second end of the brake arm opposite the first end thereof for being pulled by the brake lever, the brake wire extending along an outer side surface of the operation rod.

2. A hand-held, engine-powered bush cutting machine according to claim 1; wherein the support shaft is disposed on a side of a vertical center line of the operation rod which is opposite from the brake wire and is disposed below a horizontal center line of the operation rod.

3. A hand-held, engine-powered bush cutting machine according to claim 1; further comprising a spring connected to the brake arm for urging the brake shoe to press against the brake drum; and wherein the brake arm has a first arm portion extending from the support shaft to a mount portion of the brake wire, a second arm portion extending from the support shaft to a position where the brake shoe is connected, and a third arm portion extending from the support shaft to a position where the spring is connected, the second and third arm portions being disposed closely to each other, and the first, second and third arm portions jointly forming the brake arm into a generally Y-shaped configuration.

4. A hand-held, engine-powered bush cutting machine according to claim 2; further comprising a spring connected to the brake arm for urging the brake shoe to press against the brake drum; and wherein the brake arm has a first arm portion extending from the support shaft to a mount portion of the brake wire, a second arm portion extending from the support shaft to a position where the brake shoe is connected, and a third arm portion extending from the support shaft to a position where the spring is connected, the second and third arm portions being disposed closely to each other, and the first, second and third arm portions jointly forming the brake arm into a generally Y-shaped configuration.

5. A hand-held, engine-powered bush cutting machine according to claim 1; further comprising: a spring connected to the brake arm for urging the brake shoe to press against the brake drum; and wherein the brake arm has a first arm portion extending from the support shaft to a mount portion of the brake wire, a second arm portion extending from the support shaft to a position where the brake shoe is connected, and a third arm portion extending from the support shaft to a position where the spring is connected, the first arm portion being disposed externally of the clutch case; and
   a cover connected to the clutch case for covering the first arm portion, the first arm portion being fixedly secured to the support shaft, the support shaft being rotatably connected to a front wall of the clutch case with a distal end of the support shaft positioned internally of the clutch case, and the second and third arm portions being attached to the distal end of the support shaft.

6. A hand-held, engine-powered bush cutting machine according to claim 2; further comprising a spring connected to the brake arm for urging the brake shoe to press against the brake drum; and wherein the brake arm has a first arm portion extending from the support shaft to a mount portion of the brake wire, a second arm portion extending from the support shaft to a position where the brake shoe is connected, and a third arm portion extending from the support shaft to a position where the spring is connected, the first arm portion being disposed externally of the clutch case; and
   a cover connected to the clutch case for covering the first arm portion, the first arm portion being fixedly secured to the support shaft, the support shaft being rotatably connected to a front wall of the clutch case with a distal end of the support shaft positioned internally of the clutch case, and the second and third arm portions being attached to the distal end of the support shaft.

7. A hand-held, engine-powered bush cutting machine comprising: an engine; a housing mounted on the engine; a tubular shaft extending from the housing; a rotational shaft extending through the tubular shaft and being rotationally driven by a drive power transmitted from the engine; a cutting member connected to the rotational shaft for rotation therewith; a clutch disposed in the housing for connecting and disconnecting the drive power transmitted to the rotational shaft from the engine; a brake drum disposed on a side of the clutch for braking rotation of the cutting member; a brake arm pivotally connected to the housing proximate to the brake drum; and a brake shoe connected to an end of the brake arm for contacting an outer peripheral surface of the brake drum with a predetermined pressure to brake rotation of the cutting member.

8. A hand-held, engine-powered bush cutting machine according to claim 7; further comprising a brake wire connected to an end of the brake arm opposite the end thereof to which the brake shoe is connected for pivoting the brake arm; and further comprising a brake lever connected to the tubular shaft for pulling the brake wire to pivot the brake arm.

9. A hand-held, engine-powered bush cutting machine according to claim 8; wherein the brake wire extends along a side of the tubular shaft.

10. A hand-held, engine-powered bush cutting machine according to claim 9; further comprising a support shaft for pivotally connecting the brake arm to the housing, the support shaft being disposed on a side of the tubular shaft opposite the side thereof along which the brake wire extends and below a horizontal center line of the tubular shaft.

11. A hand-held, engine-powered bush cutting machine according to claim 10; further comprising a biasing member connected to the brake arm for biasing the brake shoe into pressure contact with the brake drum.

12. A hand-held, engine-powered bush cutting machine according to claim 11; wherein the brake arm has a plurality of arm portions extending therefrom in a generally Y-shaped configuration.

13. A hand-held, engine-powered bush cutting machine according to claim 12; wherein the plurality of arm portions of the brake arm comprises first, second and third arm portions, the first arm portion being integrally connected to the support shaft; and further comprising a cover member connected to the housing for covering the first arm portion.

14. A hand-held, engine-powered bush cutting machine according to claim 13; wherein the support shaft is mounted on the housing for rotation and has a distal end disposed in the housing; and wherein the second and third arm portions of the brake arm are connected to the distal end of the support shaft.

* * * * *